Sept. 23, 1952     L. B. PATTERSON     2,611,240
EXTERNAL-COMBUSTION ENGINE WITH WATER INJECTION
Filed May 11, 1948     4 Sheets-Sheet 4
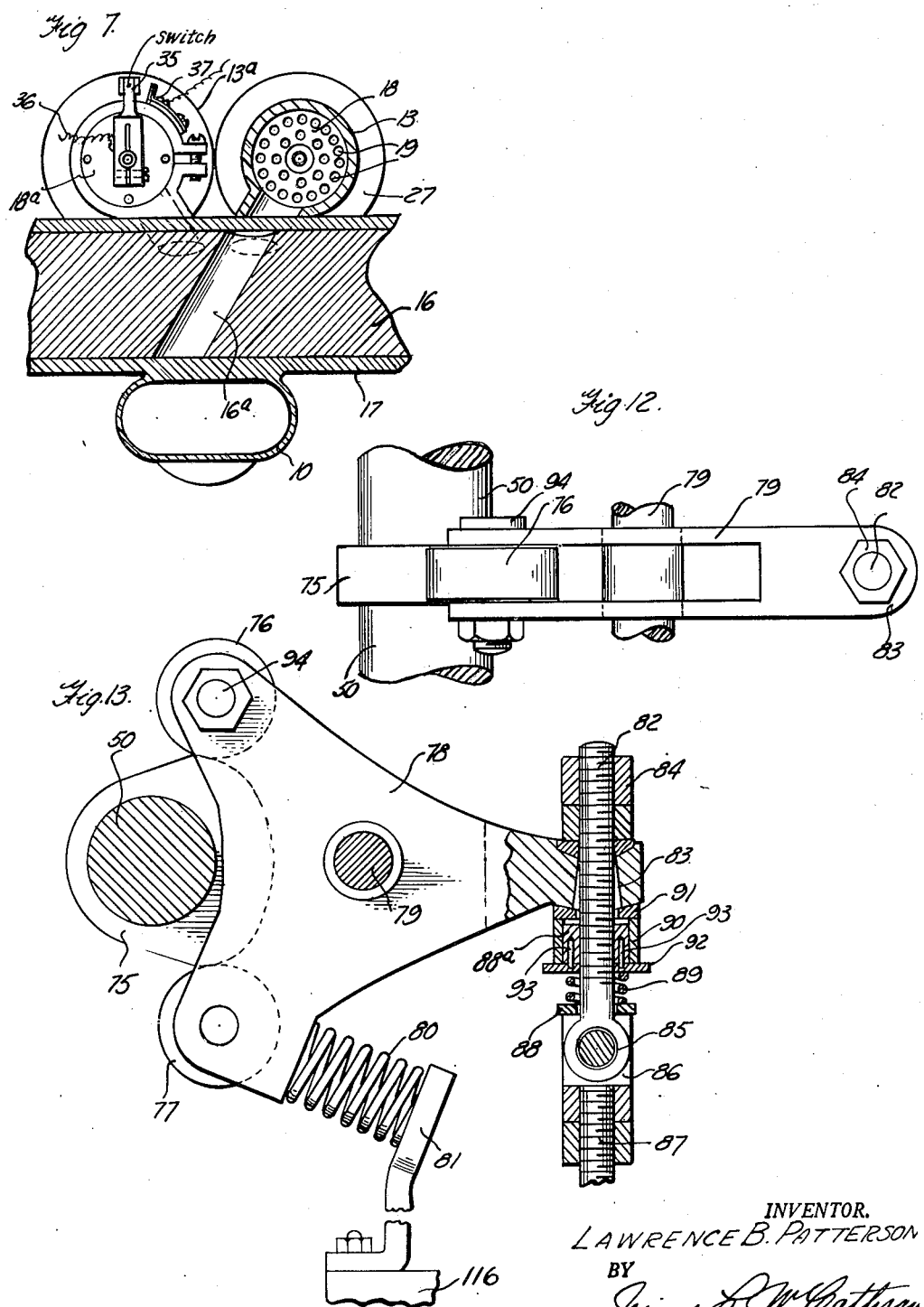
INVENTOR.
LAWRENCE B. PATTERSON
HIS ATTY.

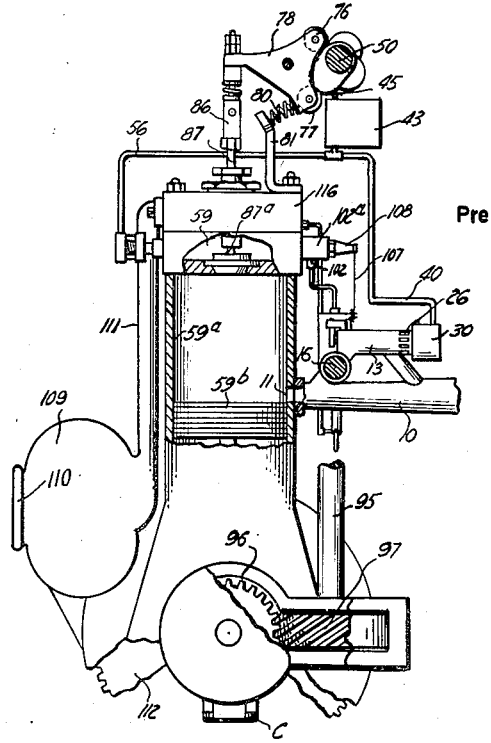

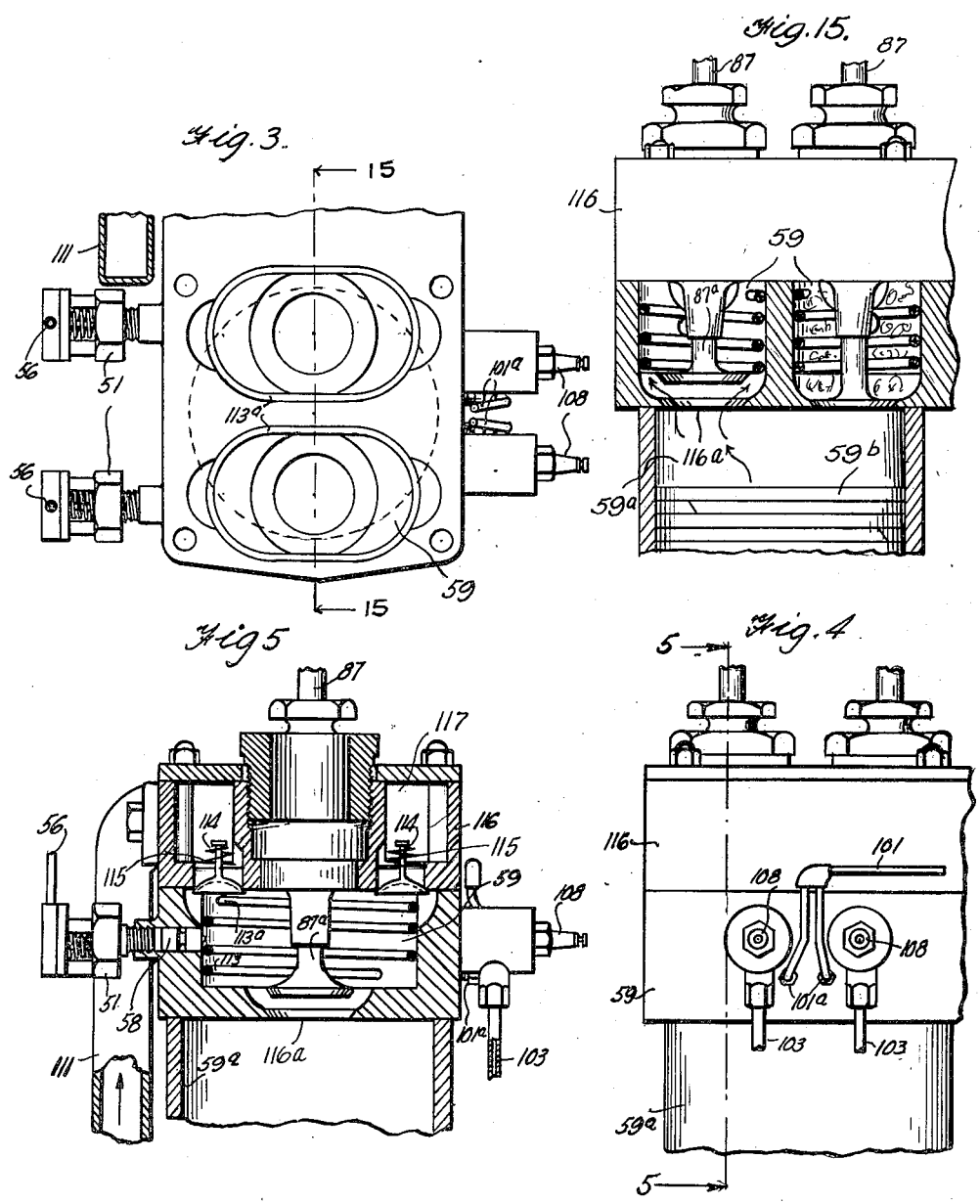

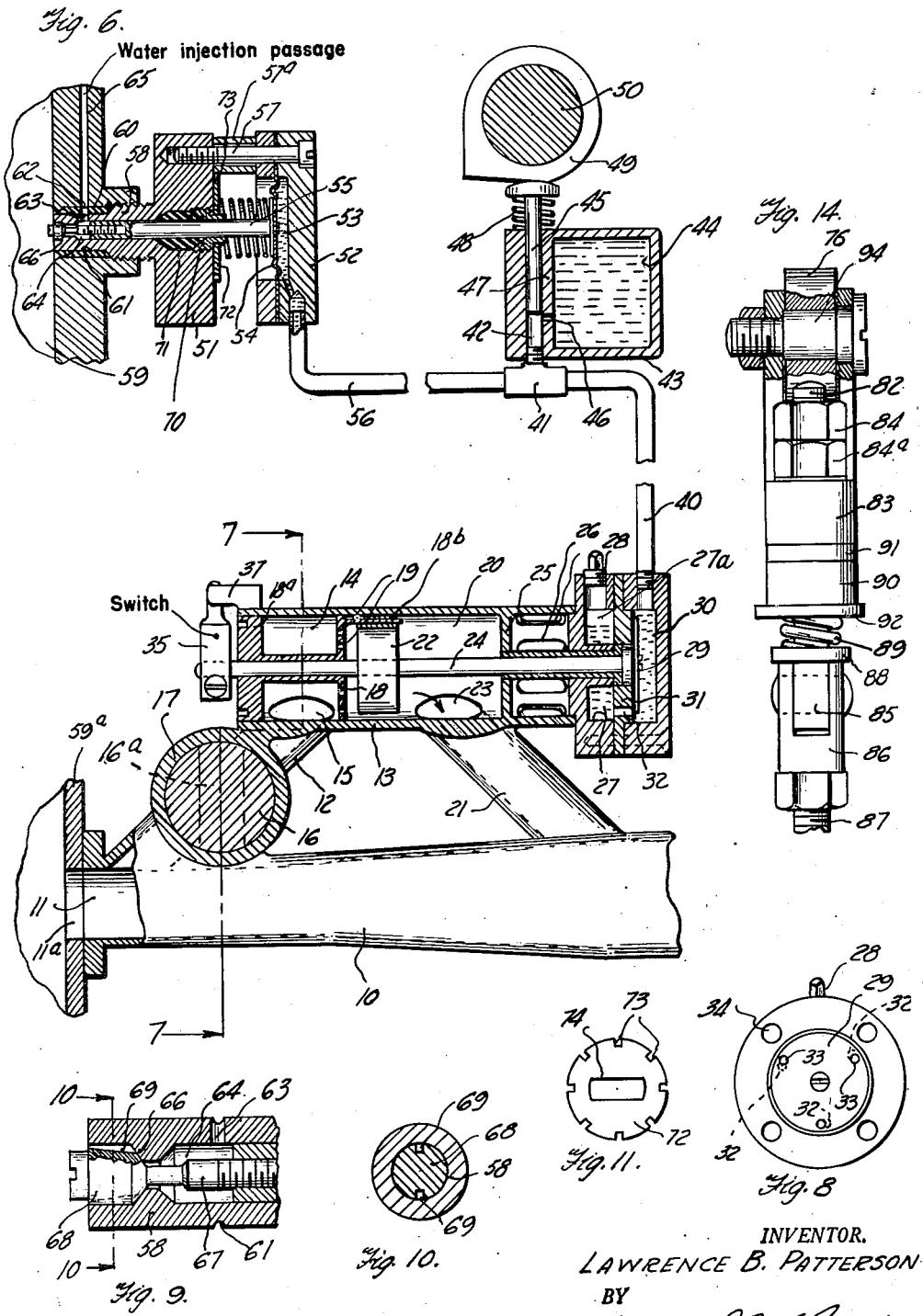

Patented Sept. 23, 1952

2,611,240

UNITED STATES PATENT OFFICE 2,611,240

EXTERNAL-COMBUSTION ENGINE WITH WATER INJECTION

Lawrence B. Patterson, Meadville, Pa.

Application May 11, 1948, Serial No. 26,466

6 Claims. (Cl. 60—39.26)

1

This invention relates to an external combustion engine, and has for one of its objects the production of a simple and efficient means for increasing efficiency of the engine, which is ordinarily lost in the conventional type of internal combustion engines.

A further object of this invention is the production of a simple and efficient means for injecting water into a combustion chamber of an engine in a manner whereby the heat in the combustion chamber turns the water into steam to increase pressure therein and to reduce temperature within the combustion chamber.

Other objects and advantages of this invention will appear throughout the following specification and claims.

In the drawings:

Figure 1 is a front elevational view of the engine, a portion of the cylinder and combustion chamber and other parts being shown in vertical section;

Figure 2 is a side elevational view looking at right-angles to Figure 1, certain parts being broken away;

Figure 3 is a fragmentary top plan view of the engine, showing two combustion chambers with the valve carrying casing removed;

Figure 4 is a fragmentary side elevational view showing the engine with the valve carrying casing in place;

Figure 5 is a vertical sectional view taken on line 5—5 of Figure 4, certain parts being shown in elevation;

Figure 6 is a sectional view through the operating parts of the invention in association with an exhaust manifold, certain parts being shown in elevation, the opposite side of the water injector valve being shown to that of Figure 1;

Figure 7 is a sectional view taken on line 7—7 of Figure 6;

Figure 8 is an end view of the thermostat unit, with the end cover removed;

Figure 9 is an enlarged fragmentary longitudinal sectional view of the water injector valve;

Figure 10 is a sectional view taken on line 10—10 of Figure 9;

Figure 11 is a plan view of the disc which fits over the packing adjusting nut shown in Figure 6, for adjusting the packing;

Figure 12 is a top plan view of the rocker arm, roller, and part of the cam shaft;

Figure 13 is a vertical side view of the structure shown in Figure 12, certain parts being shown in section, the opposite side of the rocker arm being shown to that of Figure 1;

2

Figure 14 is an end elevational view of the structure shown in Figures 12 and 13, a portion of the roller contacting the cam being shown in section, and Figure 15 is a vertical sectional view taken on line 15—15 of Figure 3, certain parts being shown in elevation.

By referring to the drawings, it will be seen that 10 (note Figure 6) designates the conventional manifold casing of a combustion engine. The casing 10 is provided with an intake port 11 leading from a cylinder to receive the exhaust, and any desired number of ports may be provided. The manifold casing 10 is provided with an angularly extending passage 12 which forms a communication between the manifold casing 10 and one end of the thermostat unit 13. The unit 13 is provided with a chamber 14 at one end thereof having direct communication with the manifold casing 10 through the port 15. A distributor valve 16 having a port 16ª is rotatably mounted intermediate the ends of the tube 12 which constitutes a passage within the valve housing 17. This valve 16 may be rotated in any desired manner which may be found convenient relative to the particular design of the engine upon which the device may be used. However, this valve 16 should be timed to rotate at one-half crankshaft speed. The rotation of the valve 16 will control the passage of the exhaust gases from the exhaust manifold 10 to the chamber 14. The unit 13 is provided with a baffle wall 18 having a series of apertures or perforations 19 therein. This baffle wall 18 separates the compartment 14 from the thermostat compartment or chamber 20 of the unit 13.

An outlet tube 21 constituting a passage, forms a communication between the compartment 20 and the exhaust manifold casing 10 at a point beyond the entrance port 11, as shown in Figure 6. Part of the exhaust gases will pass from the casing 10 into the compartment 14, through the apertured baffle wall 18, around the coiled bimetal thermostat 22 of the conventional type, and out from the chamber 20 through the port 23 to the casing 10 by means of the tube 21 which constitutes a passage. The thermostat 22 is anchored to the arm 18ᵇ. The compartment or chamber 20 is provided with an inner end wall 25 through which the shaft 24 extends. The unit 13 is provided with cooling or ventilating apertures 26 beyond the wall 25 to maintain the parts containing hydraulic fluid at a sufficiently low temperature. As shown in Figure 6, the wall 18 is carried by a sleeve through which the shaft 24 extends, this sleeve being in turn carried by an outer wall 18ª which is clamped in the outer end of the unit 13. Suitable spanner wrench receiving sockets are formed in the outer face of the wall 18ª to facilitate turning the wall 18ª to adjust the thermostat 22.

A compressed air chamber 27 is fitted at the end of the unit 13 and the shaft 24 projects therethrough, as shown in Figure 6. A plug 28 closes the hole in the chamber 27. A closure disc 29 is carried by the end of the shaft 24 within the hydraulic chamber 30 which abuts the chamber 27. A partition 31 separates the chambers 27 and 30. This partition 31 is provided with ports 32 which provide a communication between the compartments or chambers 27 and 30. The closure disc 29 has a slight clearance with the partition 31 so the disc 29 will turn freely as the thermostat 22 is adjusted by the varying temperatures. This disc 29, however, is provided with apertures 33 which are adapted to register with the ports 32 and provide communication between the compartment or chambers 27 and 30 as the shaft which carries the disc 29 turns and as the thermostat 22 expands or contracts as the temperature thereabout varies. Before the engine reaches normal running temperature, the ports 32 and 33, shown in Figure 8, are in line or register and are normally open. The chambers 27 and 30 may be anchored together in any desired manner as by bolts passing through suitable apertures such as the apertures 34 shown in Figure 8.

The switch or contact arm 35 is carried by the outer end of the shaft 24 and a contact point 37 is connected to one side of the source of electrical supply and is located to one side of the arm 35 and secured to the unit 13ª, see Figure 7. The arm 35 has a wire 36 leading to the opposite side of the line. This constitutes a make-and-break switch which is provided with suitable electrical connections described in the following. The switch arm 35 is suitably insulated from the supporting metal parts of the device. The switch 35 is connected to a battery. When the engine is cold or when the fuel has been shut off, and the thermostat 22 cools a few degrees below running temperature, the thermostat 22 will rotate the shaft 24 to close the contact between the switch 35 and contact point 37. This contact will cause the current to flow through switch 35 and point 37 and then to any suitable ignition device in the combustion chamber. After the engine warms up, the switch 35 will be moved away from the point 37 when fuel comes in contact with other hot surfaces which maintain ignition. The expansion of the thermostat 22 as it becomes heated will move the switch 35 away from the point 37.

It should be noted that the chamber 30 communicates with a pipe line 40 which is connected to an inverted T-joint 41. This joint 41 communicates with the bottom end of a chamber 42 carried by the hydraulic fluid reservoir 43. The hydraulic fluid reservoir 43 also carries a reservoir compartment 44 in which a supply of fluid is carried. A spring-pressed piston plunger 45 is slidably mounted in the compartment or chamber 42 and the lower end of the plunger 45 lies above the communication port 46 formed in the partition wall 47, which separates the chambers 42 and 44. When the plunger 45 is depressed it closes the port 46 and when it is released or raised under action of the spring 48 the port 46 is opened. When the engine is started, the plunger 45 is actuated by the cam 49 which cam is carried by the actuating shaft 50.

A water injector valve housing 51 is provided having a diaphragm housing 52. This housing 52 is provided with a fluid compartment or chamber 53. One side of the chamber 53 is closed by a diaphragm 54 and this diaphragm 54 is engaged by a spring-pressed plunger 55. A pipe 56 forms a communication between the joint 41 and the chamber 53 as shown in Figure 6. The housing 52 may be secured to the housing 51 in any suitable manner in spaced relation thereto by means of three bolts such as the bolt 57 carrying a spacing sleeve 57ª shown. The valve housing 51 is provided with a projecting threaded neck 58 which extends through the wall of the combustion chamber 59. A collar 60 is carried near the end of the neck 58 and is provided with an annular exterior channel 61 and an aperture 62 communicating with an aperture 63 in the neck 58 which aperture 63 in turn communicates with the central bore 64 of the neck 58. The apertures 62 and 63 also communicate with the water passage 65 in the wall of the combustion chamber 59. A suitable water pump 99—see Figure 2—may be provided to maintain the water passing through passages 65 at a required pressure.

The neck 58, as stated above, is provided with a bore 64, the outer end of which constitutes a valve seat 66. A valve stem 67 is threaded into and secured to the end of the plunger 55, as shown, and this valve stem 67 is provided with an enlarged valve head 68 having outwardly tapering longitudinal slots or grooves 69 which are cut on an angle to flare outwardly toward the outer end of the head 68. Since these slots or grooves 69 are cut on an angle as shown, this will allow more water to be sprayed into the combustion chamber when the valve head 68 is opened wider, caused by higher hydraulic fluid pressure, which in turn is caused by higher exhaust gas temperature.

It will be noted by considering Figures 6 and 11, that the spring-pressed plunger 55 carries a packing nut 70 which is threaded into the housing 51 for compressing the packing 71. The nut 70 carries a disc 72 having peripheral notches 73 to facilitate rotation of the disc 72 and nut 70 for adjusting the packing 71. The notches 73 are adapted to receive a suitable wrench for this purpose and the central aperture 74 receives a suitably shaped portion of the nut 70 to facilitate the rotation of the nut 70.

It should be noted that as the piston 59ᵇ of the engine compresses air into one of the two combustion chambers 59ª and the valve 87ª for that combustion chamber closes at the top of the stroke, a predetermined pressure forces the engine valve 87ª against its seat thereby preventing its opening from high pressure gases as they enter the cylinder from the other combustion chamber.

In Figures 12, 13 and 14, there is shown a rocker arm structure for use in connection with the structure above described. An actuating cam shaft 50 is shown which carries a cam 75. This cam 75 engages the upper and lower rollers 76 and 77 which are carried by a rocker arm 78, the rocker arm 78 being pivoted on the shaft 79. A spring 80 contacts the rocker arm 78 to hold the roller 77 against the cam 75. A stationary abutment 81 supports the spring 80. The rocker arm 78 carries an eye bolt 82 which extends through the apertured end 83 and carries nuts 84 and 84ª.

The eye 85 of the bolt 82 is connected to the yoke 86 carried by the conventional valve stem 87. A washer 88 is carried by the yoke 86 and a coil spring 89 is supported by the washer 88. A nut 88ª carries a sleeve 90 and a washer 91. A washer 92 contacts the lower end of the nut 88ª and this washer carries pins 93 which are slidably mounted in suitable holes in the nut 88ª to allow for a limited downward movement of the washer 92 and at the same time prevent the nut 88ª from turning. It should be noted that the roller 76 is mounted on an eccentric pin 94, which pin may be adjusted to move the roller toward or away from the cam 75 to provide for a slight clearance between the rollers 76 and 71 and the cam 75, when the valve is closing.

It should be noted that the tension of the spring 89 may be adjusted by threading the nut 88ª in the desired direction upon the threaded eye bolt 82. After the valve seats the rocker arm may continue to swing against the tension of the spring 89 until the washer 92 moves away from the nut 88ª, due to the fact that the pins 93 are slidably mounted in this nut 88ª. The rocker arm 78 forces downwardly against the washer 91 and sleeve 90 to accomplish the downward movement of the washer 92. This operation allows the full pressure of the spring 89 to force the valve against the valve seat. This structure provides a means for compensating for wear upon the arm 78 and also provides a maximum variation of adjustment. It should be noted in Figure 13 that the aperture in the eye 85 of the bolt 82 is exaggerated in size to permit the parts to properly function.

It should be understood that in the operation of the engine the piston compresses air into one of the two combustion chambers 59 and the valve 87ª for that combustion chamber closes at the top stroke. A predetermined pressure forces the valve against its seat preventing its opening from high pressure gases as they enter the cylinder from an adjoining or other combustion chamber.

As the piston of the engine on its downward stroke uncovers the exhaust port 116ª, providing communication with the angular port 16ª in the exhaust gas distributor rotary valve 16, part of the exhaust gases from the exhaust manifold 10 will pass to one of the two thermostat chambers 14, the two chambers being shown in Figure 7, and the gases will alternately pass to the chamber 14 in one unit 13 and then to adjacent unit 13ª as the valve 16 rotates. The units 13 and 13ª are mounted side by side and are similarly constructed, the unit 13ª being shown in end elevation, and the unit 13 being shown in section through the chamber or compartment 14. Each unit 13 and 13ª is connected and supported in a similar manner upon the exhaust manifold 10 and each unit is provided with a tube similar to the tube 21 leading back to the exhaust manifold. It should be understood that the units may be multiplied, depending upon the number of cylinders of the engine upon which the device or mechanism may be installed.

As the exhaust gases pass through the port 15 of the unit 13 into the chamber 14 and pass the thermostat 22 and out through the port 23 of the chamber 20 to the manifold 10, the shaft 24 will rotate due to the expansion of the thermostat and actuate the switch arm 35 as above described. As the rotary valve 16 continues to rotate, the exhaust gas distributer being geared to rotate at one-half crankshaft speed, the angular port 16ª will pass the exhaust gases from the manifold 10 to the adjoining unit 13ª during the next exhaust period. The passage 12 of each unit receives the exhaust gases and directs the same to the thermostat which controls the injection into that particular combustion chamber. Thus, the same thermostat always reacts to the gases from the same combustion chamber. It will be noted that the tube or passage 12 has its entrance end in close proximity to the exhaust port 11ª of the cylinder 59ª. When the engine is cold, the apertures 33 in the disc 29 line up with the ports 32 allowing fluid to pass from chamber 30 to 27. When the engine is started, this will rotate the cam 49. Upon the downward stroke of the spring pressed plunger 45, as the cam 49 is rotated, this plunger 45 will force the hydraulic fluid from the reservoir 44 down through pipe 40 into chamber 30, through apertures 33, ports 32, compressing air in the air space 27ª, see Figure 6, of the chamber 27. On the upward stroke of the plunger 45, the compressed air in the chamber 27 forces the hydraulic fluid back through the line 40 in a reverse direction. Thus, as the plunger 45 is actuated, the hydraulic fluid surges back and forth through the line or pipe 40, as long as fluid can pass to and from chamber 30 to 27 compressing the air. As the exhaust gases warm up the thermostat 22, the shaft 24 will be rotated thereby. As the shaft 24 rotates, the disc 29 will also rotate to reduce the size of the ports and thereby increase the resistance to the passage of fluid through the ports 32 and prevent free passage of the fluid therethrough. As resistance to flow of fluid increases, pressure of the fluid in the pipe or lines 40 and 56 increases during the downward stroke of the plunger 45. When sufficient pressure has been reached, pressure on the diaphragm 54, see Figure 6, will become great enough to overcome the tension of the spring plunger 55, and thereby move the valve head 68 from its seat 66. Water under high pressure greater than the gases in the combustion chamber is then forced through the passage 65 and into the combustion chamber 59. The amount of water sprayed into the combustion chamber will depend upon the position of the head 68 due to the tapering channels which extend longitudinally of the head 68. The valve head 68 will open wider to spray more water into the combustion chamber 59 as higher exhaust temperature causes a higher hydraulic fluid pressure on the diaphragm 54.

I have described the details of the elements shown in Figures 6 to 14 inclusive in the foregoing, whereas the following description deals primarily with the assembled engine. It should be understood that the term "pump" as used in the claims, refers to the pumping elements of a pulsator, as illustrated in Figure 6.

By referring particularly to Figures 1 to 5 inclusive, it will be noted that two cylinders of an engine are shown, although any proper number of cylinders may be used without departing from the spirit of the invention. Suitable bearings, brackets and the like, which are omitted may be added where required. In Figure 1 the combustion chamber is designated at 59 which is located above the operating cylinder 59ª, in which cylinder is located the piston 59ᵇ. The exhaust port 11 leads from the cylinder 59ª to the exhaust manifold 10.

A crankshaft helical gear 96 drives the gear 97 which is carried by the shaft 95 and drives this shaft 95 at one-half crankshaft speed. This shaft 95 also drives the shaft 16 by means of gears 95ª and the shaft 50 by means of gears 95ᵇ also at one-half crankshaft speed. The fuel pump 98 and the water pump 99, as well as the exhaust gas distributer are driven from the shaft 16. A water line 100 is connected to the water tank, not shown, and the high pressure water line 101 conveys water to the water injector valves. This water in the line 101 may be preheated, if desired, such for instance, by passing through a coil which is heated by exhaust gases. The water is raised to the desired temperature after passing through the connections 101ª—see Figures 4 and 5—and then through coils 113 of the respective combustion chambers to which they are connected. The water leaves the coil 113 at the upper end 113ª of each coil and then goes directly to the water injector valve 51 of its respective combustion chamber, through the passage 65 shown in Figure 6 in the wall of the combustion chamber 59, and is then sprayed into the combustion chamber 59.

The camshaft 50 shown in Figures 1, 2 and 6 actuates the valves 87 of the engine combustion chambers, as well as the hydraulic plunger 45. The hydraulic lines 40 lead from the hydraulic chambers 30 to the plungers 45 of the reservoir 43. The line 56 leads from the reservoir 43 adjacent the plunger 45 to the water injection valve 51—see Figures 1 and 6. Fuel injector valves 102 are connected to the fuel pump 98 by means of the lines 103. Four conventional precombustion cells 102ª or one for each combustion chamber in the structure shown in Figure 2, are used. By utilizing the wiring shown, when the switch 104 is closed, the current flows from the battery through the switch 104, wire 105 and wires 106. There are four of these wires 106 which are connected to the contact points 35 of the four thermostat units 13; see Figures 2 and 6. If the motor is cold, the current will flow from point 35 to point 37, as these points will be making contact until the engine warms up. The current will then pass through the four wires 107 to the glow plug or igniter 108.

A scavenging air blower 109 having a flanged inlet 110 is connected to the air dome 116 located above the combustion chamber 59 by means of a communication tube 111, shown in Figure 1. The air blower may be driven in any suitable manner from the gear 112 on the crankshaft C. The automatically operated air valves 114, as shown in Figure 5, are semi-spherical in shape and are concave on their undersides to lighten them. These valves 114 are normally held in a closed position by means of light springs 115. The valves 114 may be mechanically operated if desired without departing from the spirit of the invention. The air dome 116 also shown in Figure 5, is located above the combustion chamber 59 and air is maintained in the air dome 116 at a low pressure in the cavity 117 by the air blower 109, shown in Figure 1. These valves 114 are opened when the piston 59ᵇ uncovers the exhaust port 11 and pressure in the cylinder and combustion chamber momentarily becomes less than the air pressure in the cavity 117 in the dome 116 above the valves 114.

When the piston 59ᵇ is at the bottom of its stroke and in the position shown in Figure 1, exhaust is taking place. The air valves 114 shown in Figure 5 are open and air is entering the combustion chamber and cylinder, thereby driving out any gases remaining and filling the cylinder with fresh air. As the piston 59ᵇ moves upwardly it closes the exhaust port 11 and starts to compress the air. This action will close the air valves 114. When the piston 59ᵇ reaches the end of its first or upward stroke, the valve 87ª carried by the valve stem 87 closes, thereby trapping the compressed air in the combustion chamber 59. Meanwhile the valve 87ª in the adjacent or second combustion chamber has started to open and gases which have previously built up pressure start to enter the cylinder to drive the piston 59ᵇ downwardly. At this time the valve 87ª in the first combustion chamber will be forced open if it were not for a predetermined pressure forcing the valve against its seat. As the piston 59ᵇ uncovers the exhaust port on completing its downward or second stroke, fuel injection and combustion has been completed in the first combustion chamber and water injection is taking place. The piston 59ᵇ now compresses air into the second combustion chamber during its upward and third stroke after the cylinder has been scavenged. As the valve 87ª closes in the second combustion chamber, trapping the compressed air when the piston reaches the top of its stroke, the valve 87ª in the first combustion chamber has started to open, thereby allowing the gases which have built up a high pressure to drive the piston 59ᵇ down on its fourth stroke. It will therefore be seen that combustion takes place alternately in the two combustion chambers, and a cycle is completed in each combustion chamber every fourth stroke of the piston, but the piston receives a power impulse every second stroke such as is the case with a two-cycle engine.

It should be understood that certain changes in detail construction may be made without departing from the spirit of the invention, and it is not desired to limit the structure of the various elements to that illustrated since changes may be made so long as these changes obtain the objects of the invention.

I preferably refer to my invention as an external combustion engine because the combustion takes place in the combustion chamber at a time when there is no open communication between the combustion chamber and the cylinder due to the fact that the valve 87ª closes this communication. In other words, the combustion takes place outside of the cylinder. A plurality of combustion chambers are employed for each cylinder of the engine, and by using the type of engine shown and described, and a water injection, advantages are obtained which are not found in other engines. The improved valve mechanism and the thermostatic regulation for controlling the quantity of water injected into each individual combustion chamber according to the temperature of the exhaust gases are important features of the invention.

Besides using a maximum of created heat for power to increase efficiency and enable the use of a low grade fuel due to the great length of time allowed for combustion to take place, more power per pound of weight is obtained than may be obtained from a conventional type of aircraft engine. Due to the fact that water is injected into the combustion chamber after combustion is completed a maximum pressure is built up to drive the piston down. Thus the power impulse is greater in comparison to the compression in each cylinder every revolution of the crankshaft instead of every other revoltion as is the case with the conventional four-cycle engine. The use of a low volatile fuel, especially in aircraft engines will lower the fire hazards. Furthermore, in the structure herein set forth, the combustion chambers are contiguous to the cylinders, thereby avoiding the use of long channels or passageways between the combustion chambers and cylinders which impair the efficiency of the engine.

Having described the invention, what is claimed as new is:

1. An engine of the class described comprising a cylinder, a piston within the cylinder, a combustion chamber having a port communicating directly with said cylinder, a valve for opening and closing said port, means for creating combustion in said combustion chamber when said port is closed thereby producing combustion exteriorly of the cylinder, means for injecting water directly into said combustion chamber turning the water into steam to increase pressure and to reduce temperature within the combustion chamber, an exhaust means for said cylinder, an adjustable thermostat controlling the quantity of water admitted to said chamber to hold the exhaust gases to a predetermined temperature, means for opening the valve to provide direct communication between the cylinder and combustion chamber after combustion takes place, an exhaust means for the cylinder for removing spent gases from the cylinder, the thermostat being located adjacent the exhaust means and being automatically regulated by the heat of said exhaust means to vary the amount of water which is admitted to the combustion chamber, means for admitting air into the combustion chamber, and means for closing the valve to trap the air in the combustion chamber.

2. An engine of the class described comprising a cylinder, a piston within the cylinder, a combustion chamber having a port communicating directly with said cylinder, a valve for opening and closing said port, means for creating combustion in said combustion chamber when said port is closed thereby producing combustion exteriorly of the cylinder and in close proximity thereto, means for injecting water into said combustion chamber immediately after combustion is completed, the heat in the combustion chamber turning the water into steam to increase pressure and to reduce temperature within the combustion chamber, a heat radiating exhaust means for said cylinder, an adjustable thermostat carried by the exhaust means of said cylinder and actuated by the heat of the exhaust passing through the exhaust means to vary the quantity of water admitted to said chamber and to thereby hold the exhaust gases to a predetermined temperature, means for opening the valve to provide communication between the cylinder and combustion chamber after combustion takes place, means for admitting air into the combustion chamber, and means for closing the valve to trap the air in the combustion chamber.

3. An engine of the class described comprising a cylinder, a piston in said cylinder, a combustion chamber communicating therewith, a water spraying means for spraying water into said chamber, a valve for regulating the spraying of water from said spraying means, a diaphragm for actuating said valve, a fluid pressure means for actuating said diaphragm, a pump for maintaining flow of fluid through said fluid pressure means, an exhaust gas receiving manifold communicating with said cylinder, and a temperature controlled means communicating with said exhaust manifold for cutting off part of the flow of fluid through a portion of said fluid pressure means when the temperature of the exhaust gases in said exhaust manifold reaches a predetermined degree and to direct the pressure of the fluid to said diaphragm for operating said valve.

4. An engine of the class described comprising a cylinder, a combustion chamber having direct communication with said cylinder, a piston in said cylinder, a water injection means, a water spraying means for spraying water into said chamber, a valve for regulating the spraying of water from said spraying means, a diaphragm for actuating said valve, a fluid pressure means for actuating said diaphragm, said fluid pressure means comprising a pump, a fluid receiving chamber for receiving fluid from said pump, a compression chamber for receiving fluid from the first mentioned chamber and having an air pocket against which the fluid is cushioned in a manner whereby the fluid will surge back and forth from the pump and the fluid receiving chamber and compression chamber as the pump is actuated, a cut-off valve carried between the chambers, an exhaust gas receiving manifold connected to said cylinder, a temperature controlled means communicating with said manifold and receiving heat therefrom for actuating said valve to increase resistance to the flow of fluid between the chambers when temperature of the exhaust gases reaches a predetermined degree within said manifold, and a communication means for conveying the fluid pressure from the pump to the diaphragm for actuating said diaphragm when said cut-off valve is moved to a restricting position.

5. An engine of the class described comprising a cylinder, a piston in said cylinder, a combustion chamber, a water injection means, a water spraying means for spraying water into said chamber, a valve for regulating the spraying of water from said spraying means, a diaphragm for actuating said valve, a fluid pressure means for actuating said diaphragm, said fluid pressure means comprising a pump, a fluid receiving chamber for receiving fluid from said pump, a compression chamber for receiving fluid from the first mentioned chamber and having an air pocket against which the fluid is cushioned in a manner whereby the fluid will surge back and forth from the pump and the fluid receiving chamber and compression chamber as the pump is actuated, a cut-off valve carried between the chambers, an exhaust gas receiving means for said cylinder, a temperature controlled means communicating with said gas receiving means for receiving heat therefrom for actuating said cut-off valve and partly cutting off communication between the chambers when temperature within the combustion chamber reaches a predetermined degree, a communication means for conveying the fluid pressure from the pump to the diaphragm for actuating said diaphragm when said cut-off valve is closed, a partition separating the fluid receiving chamber and the compression chamber, said partition having ports, said cut-off valve comprising a disc having ports adapted to register with the ports in said partition, and said temperature controlled means being rotatable and adapted to rotate said disc to open and close said ports.

6. An engine of the class described comprising a cylinder, a piston in said cylinder, a combustion chamber, a water injection means, a water spraying means for spraying water into said chamber, a valve for regulating the spraying of water from said spraying means, a diaphragm for actuating said valve, a fluid pressure means for actuating said diaphragm, a pulsator for maintaining flow of fluid through said fluid pressure means, an exhaust gas receiving manifold for said cylinder, a temperature controlled means communicating with said manifold for receiving heat therefrom for partly cutting off the flow of fluid through a portion of said fluid pressure means when the temperature of the exhaust gases reaches a predetermined degree within said manifold and to direct the pressure of the fluid to said diaphragm for operating said valve, said valve having a head, said head having longitudinal tapering channels constituting spray regulating means to vary the volume of spray in proportion to the degree of opening of said valve.

LAWRENCE B. PATTERSON.

REFERENCES CITED

The following references are of record in the file of this patent:

UNITED STATES PATENTS

| Number | Name | Date |
| --- | --- | --- |
| 635,095 | Fessler | Oct. 17, 1899 |
| 880,744 | Lake | Mar. 3, 1908 |
| 980,801 | Kraus | Jan. 3, 1911 |
| 1,102,345 | Lemale | July 7, 1914 |
| 1,145,389 | Schneider | July 6, 1915 |
| 1,236,793 | Warman | Aug. 14, 1917 |
| 1,253,413 | Morris | Jan. 15, 1918 |
| 1,890,651 | Koch | Dec. 13, 1932 |
| 2,196,430 | Sprenger | Apr. 9, 1940 |
| 2,199,344 | MacMillan | Apr. 30, 1940 |
| 2,221,185 | Farlow | Nov. 12, 1940 |

FOREIGN PATENTS

| Number | Country | Date |
| --- | --- | --- |
| 368,263 | Great Britain | Feb. 26, 1932 |